United States Patent [19]
Kim

[11] Patent Number: 5,154,676
[45] Date of Patent: Oct. 13, 1992

[54] POWER DRIVING DEVICE FOR BICYCLE

[75] Inventor: Se U. Kim, 705-5, Habjung-dong, Pyungtak, Kyunggi-do, Rep. of Korea

[73] Assignees: Se Ung Kim; Byong Kook Lee, both of Seoul, Rep. of Korea

[21] Appl. No.: 699,957

[22] Filed: May 14, 1991

Related U.S. Application Data

[63] Continuation-in-part of Ser. No. 311,085, Feb. 14, 1989, abandoned.

[30] Foreign Application Priority Data

Feb. 29, 1988 [KR] Rep. of Korea .................. 2145/1988

[51] Int. Cl.⁵ .............................................. F16H 3/44
[52] U.S. Cl. .................................. 475/317; 74/594.2; 280/261
[58] Field of Search ............... 74/594.2; 475/295, 317; 280/260, 261, 236

[56] References Cited
U.S. PATENT DOCUMENTS

| | | | |
|---|---|---|---|
| 293,081 | 2/1884 | Rennyson | 74/750 B X |
| 2,392,250 | 1/1946 | Lucas | 280/260 X |
| 2,479,654 | 8/1949 | Warburton | 74/789 |
| 2,494,558 | 1/1950 | Irwin . | |
| 2,672,225 | 3/1954 | Asp . | |
| 2,795,970 | 6/1957 | Kollmann et al. . | |
| 3,007,352 | 11/1961 | Biedess | 475/317 X |
| 3,842,691 | 10/1974 | Shea . | |
| 3,874,253 | 4/1975 | Waddington . | |
| 3,944,425 | 3/1976 | Ripley, III | 475/317 X |
| 4,193,324 | 3/1980 | Marc | 74/594.2 X |
| 4,261,223 | 4/1981 | Johnson | 74/594.2 |
| 4,334,440 | 6/1982 | Fonck | 475/317 X |
| 4,856,376 | 8/1989 | Billini . | |

FOREIGN PATENT DOCUMENTS

245261 7/1947 Switzerland .
16195 of 1893 United Kingdom .
17838 of 1894 United Kingdom .
3116 of 1903 United Kingdom .

Primary Examiner—Richard Lorence
Assistant Examiner—Benjamin Levi
Attorney, Agent, or Firm—Leighton K. Chong

[57] ABSTRACT

A power driving device for a bicycle has a planetary gear assembly mounted with a driving axle shaft, including a housing fixed to the bicycle frame with a side wall rotatably mounting the driving axle shaft and a flange wall projecting laterally from the side wall which contains the planetary gear assembly and has a ring gear fixed thereto, a pinion gear carrier fixed to the driving axle shaft for rotation together therewith upon application of a driving force to the pedals, and a sun gear fixedly connected to a driving sprocket wheel for transmitting power from the pedals to the rear wheel of the bicycle. The planetary gear assembly can provide a power changing ratio in the range of about 3.5, so that the driving sprocket wheel can have a number of teeth substantially less than the number of teeth on a conventional sprocket wheel yet, when multiplied by the power changing ratio of the planetary gear assembly, is equivalent to more than double that of the conventional sprocket wheel. In other embodiments, the planetary gear assembly is provided at the rear wheel axle shaft of the bicycle, which is fixed to the pinion gear carrier and is driven by a rear sprocket wheel linked by a chain to a front sprocket wheel driven by the pedals, and the sun gear is fixed to a hub for the rear wheel. Alternatively, two planetary gear assemblies are used, one at the pedal position and the other at the rear axle shaft, to provide a combined power changing ratio that is doubled.

19 Claims, 5 Drawing Sheets

POWER DRIVING DEVICE FOR BICYCLE

This application is a continuation-in-part of application Ser. No. 07/311,085, filed Feb. 14, 1989, now abandoned.

FIELD OF THE INVENTION

This invention generally relates to a power driving device for a bicycle. In particular, a planetary gear power transmission device is arranged between the driving axle shaft and the sprocket wheel at the pedal position of the bicycle and/or between the rear wheel axle shaft driven by the rear sprocket wheel and the rear wheel hub, so that a high gearing ratio can be obtained even with a sprocket wheel of small diameter, and a high driving power can be obtained as compared to a conventional bicycle.

BACKGROUND ART

Figure 9:
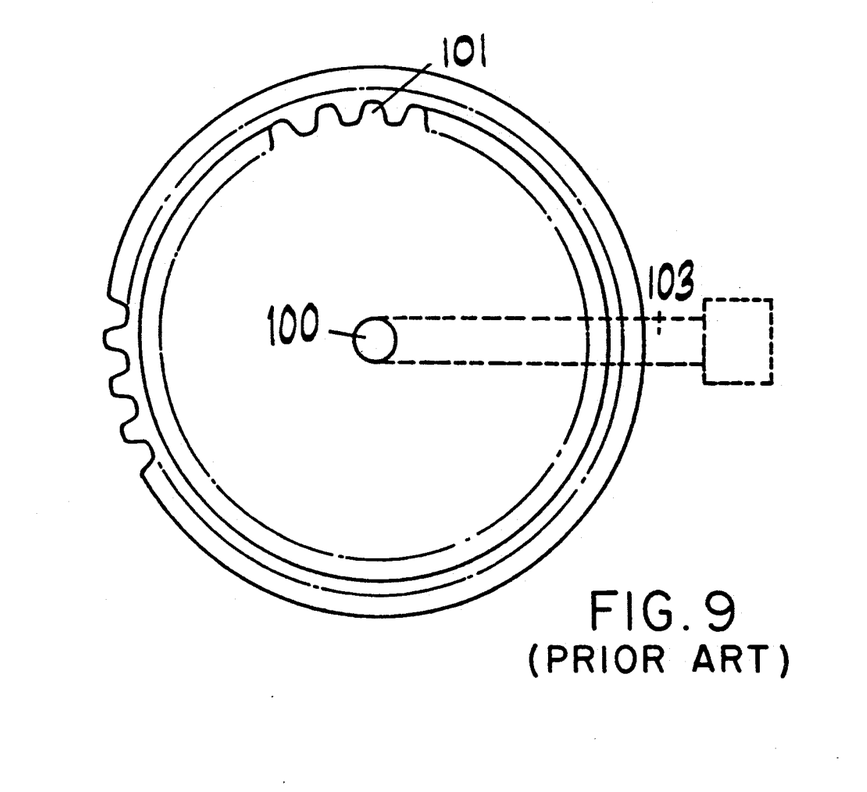
FIG. 9 is a schematic view of the pedal arrangement for a conventional bicycle.

Referring to the driving mechanism of a conventional bicycle, as shown in FIG. 9, a sprocket wheel 101 of relatively large radius (for example, about 10 cm–13 cm) which is directly coupled to a driving axle shaft 100 turned by driving the bicycle pedals, is arranged side by side with a single or double sprocket teeth sets, and a chain is connected over one of these teeth sets of the sprocket wheel 101 and over a sprocket wheel of the rear wheel so that the power is transmitted. The power increasing ratio or reducing ratio is determined merely in accordance with the difference of the number of sprocket teeth between the driving sprocket wheel 101 and the sprocket wheel of the rear wheel.

The prior art discloses various kinds of arrangements for multiple gearing ratios for the driving sprocket wheel and rear sprocket wheel, but these have some faults. In order to obtain a higher power ratio, the diameter of the driving sprocket wheel 101 has to be larger while the diameter of the rear sprocket wheel must be relatively smaller. However, in order to obtain a high torque and also lower power reduction ratios, the driving and rear sprocket wheels must have relative diameters contrary to that mentioned above.

Also, since the location of the driving axle shaft 100 of the bicycle is limited to a predetermined height (about 20 cm) from the ground level and the length of the driving arm 103 must be shorter than the axle height and typically does not exceed about 16 cm from the axis of the driving axle shaft 100, there has been a substantial limitation in the power increasing ratio as well as reducing ratio. If the diameter of the driving sprocket wheel 101 is increased, the weight of the driving sprocket wheel 101 becomes heavy, which increases the torque required to turn it and consumes unnecessary physical strength for running on a sloped road as well as on a level road.

The prior art also discloses various kinds of planetary gear arrangements for bicycles. However, the conventional devices have faults in that they are relatively bulky and of complicated construction which is costly and inconvenient for manufacture and assembly.

It is therefore a principal object of the present invention to provide a power driving device for a bicycle which provides a high power increasing ratio, yet is compact, inexpensive, and of a simple construction that would allow convenient manufacture and assembly. It is a specific object of the invention to employ a planetary gear type of power driving transmission for a bicycle.

SUMMARY OF THE INVENTION

In accordance with the present invention, a power driving device for a bicycle has a planetary gear assembly mounted with the driving axle shaft, including a housing fixed to the bicycle frame and having a side wall rotatably mounting the driving axle shaft and a flange wall projecting laterally from the side wall at a radially outward position for containing the planetary gear assembly therein, a disc shaped carrier fixed to the driving axle shaft for rotation together therewith upon application of a driving force to the pedals, a plurality of rotatable planetary pinion gears carried on the carrier, a ring gear fixed to an inner portion of the flange wall of the housing facing radially inward toward and engaged with the planetary pinion gears, and a sun gear rotatably mounted on the driving axle shaft facing radially outward toward and engaged with the planetary pinion gears, and a driving sprocket wheel rotatably mounted on the driving axle shaft and fixedly connected to the sun gear for transmitting power applied from the pedals to the rear wheel of the bicycle.

The housing walls provide a compact containment for the planetary gear assembly. In one embodiment, the ring gear is formed integrally with the housing flange wall, the carrier is formed integrally with the driving axle shaft, and the driving sprocket wheel is formed integrally with the sun gear, thereby allowing the entire assembly to be manufactured and assembled compactly, inexpensively and easily. In one configuration, the sprocket wheel is spaced apart from the side wall of the housing with the pinion gear carrier disposed between them. In another version, the pinion gear carrier is spaced apart from the side wall of the housing with the sprocket wheel disposed between them.

In the planetary gear assembly, the sun gear has a number of teeth S in relation to the ring gear having a number of teeth R such that a power changing ratio for the planetary gear assembly is in the range of $(S+R)/S$ equal to about 3.5. This allows the driving sprocket wheel to have a number of teeth which is substantially less than the number of teeth on a conventional sprocket wheel yet, when multiplied by the power changing ratio of the planetary gear assembly, is equivalent to more than double the number of teeth of the conventional sprocket wheel.

In another embodiment of the invention, the planetary gear assembly is provided at the rear wheel axle shaft of the bicycle, which is fixed to the pinion gear carrier and is driven by a rear sprocket wheel linked by a chain to a driving sprocket wheel driven by the pedals, and the sun gear is fixed to a hub for the rear wheel. In a further embodiment, two planetary gear assemblies are used, one at the pedal position and the other at the rear axle shaft, thus providing a combined power changing ratio that is doubled.

Other objects, features, and advantages of the present invention will become apparent from the following detailed description of the best mode of practicing the invention when considered with reference to the drawings, as follows:

DETAILED DESCRIPTION OF PREFERRED EMBODIMENTS

The present invention is provided to overcome the faults of a conventional bicycle power driving arrangement, as shown in FIG. 9. Several different embodiments of the invention are shown in detail in FIGS. 1 to 8 and 10.

In FIGS. 1 to 4 and 7, one embodiment of the present invention has a planetary gear assembly 14 at at the pedal position of the bicycle. A second planetary gear assembly may also be provided at the rear wheel (indicated in dashed lines) to provide a combined effect, as described further below. The planetary gear assembly 14 is composed of a carrier 1 in a disc shape which is fixed, or preferably integrally formed, with a driving axle shaft 3 coupled to driving arms 2 for the bicycle pedals, a plurality of planetary pinion gears 4 rotatably carried on the carrier 1, a ring gear 5 formed with a part of a housing 6 which is fixed to a part of the bicycle frame, indicated generally as "F", and a sun gear 7 rotatably mounted on the driving axle shaft 3 at the center of the assembly. The housing 6 has a side wall 6A rotatably mounting (through bearings) the driving axle shaft 3, and a flange wall 6B projecting laterally from the side wall 6A at a position radially remote from the driving axle shaft 3.

Figure 3:
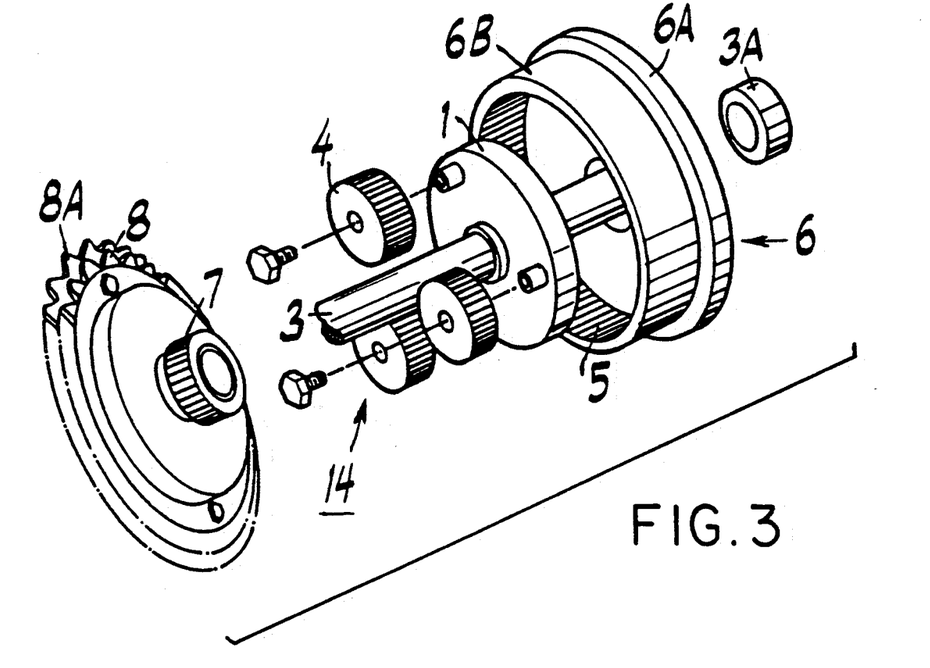
FIG. 3 is an exploded perspective view of the planetary gear assembly in FIG. 2.
Figure 4:
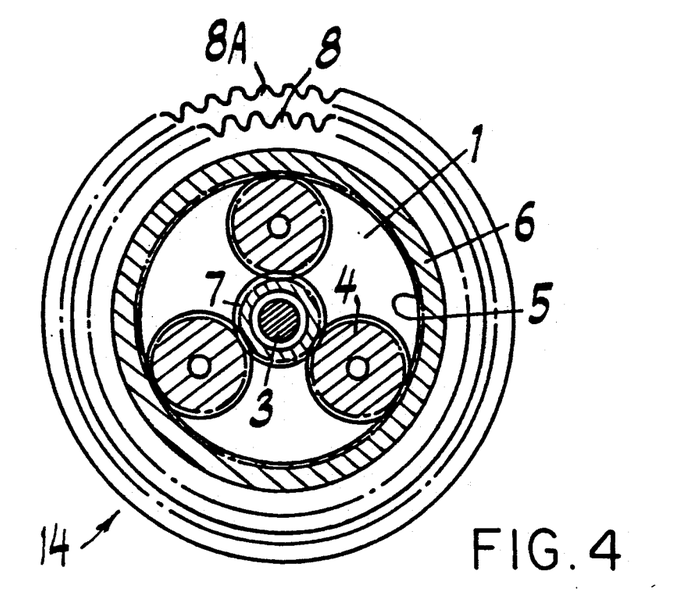
FIG. 4 a transverse sectional view of the planetary gear assembly in FIG. 2.

The side wall 6A and flange wall 6B provides a compact structure for holding the components of the planetary gear assembly, and for enclosing the assembly to protect it from contamination by dirt and debris. The ring gear 5 is formed integrally on an inner portion of the flange wall 6B facing radially inward toward the pinion gears 4. The carrier 1 for the pinion gears 4 is formed integrally with the driving axle shaft 3 which is turned by the driving arms 2, and the sun gear 7 is formed integrally with the set of driving sprocket wheels 8, 8A which transmit the driving power from the pedals via a chain 21 to a rear sprocket wheel 11 at the rear wheel 20. The planetary gear assembly is thus formed with a reduced number of parts, and can be manufactured at reduced cost and assembled easily as shown in FIG. 3. The integral sprocket wheel and sun gear part (7, 8, 8A) is readily assembled on the driving axle shaft 3 to mate with the housing 6 for the planetary gear assembly. The sprocket wheels 8, 8A are spaced apart opposite from the side wall 6A of the housing with the carrier 1 in the form of a plate being disposed between them and contained within the confines of the housing 6. A locking element, such as indicated at 3A, is used to fix the position of the housing 6 on the driving axle shaft.

Figure 5:
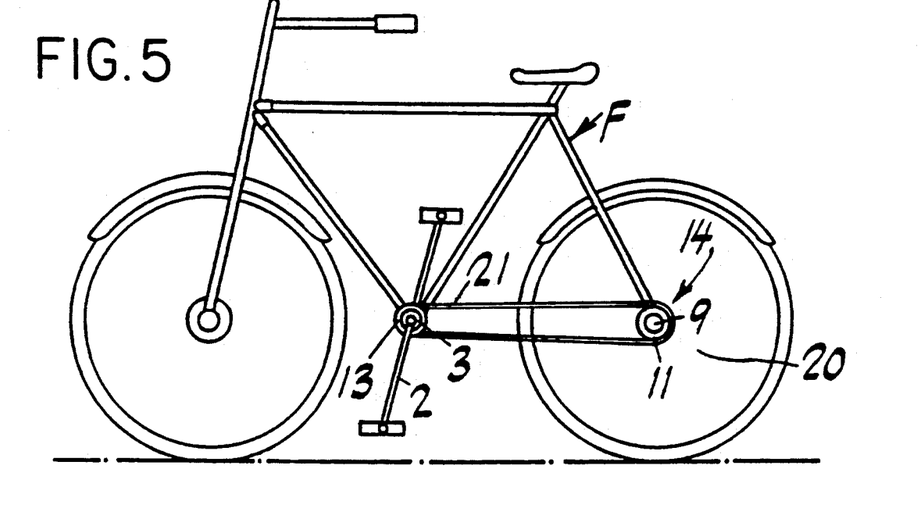
FIG. 5 is a side view showing a planetary gear assembly at the rear wheel, in accordance with the present invention.
Figure 6:
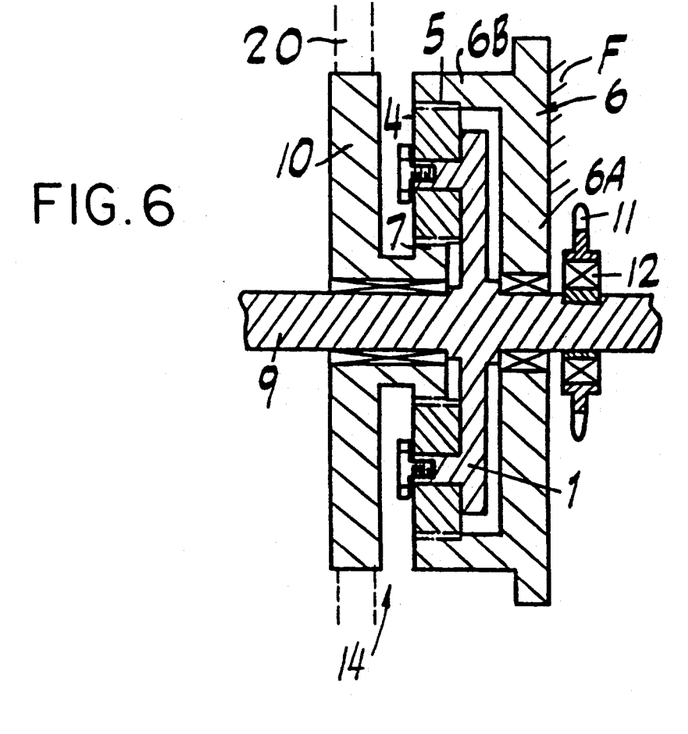
FIG. 6 is a longitudinal cross sectional view of the planetary gear assembly for the pedal position in FIG. 5.
Figure 7:
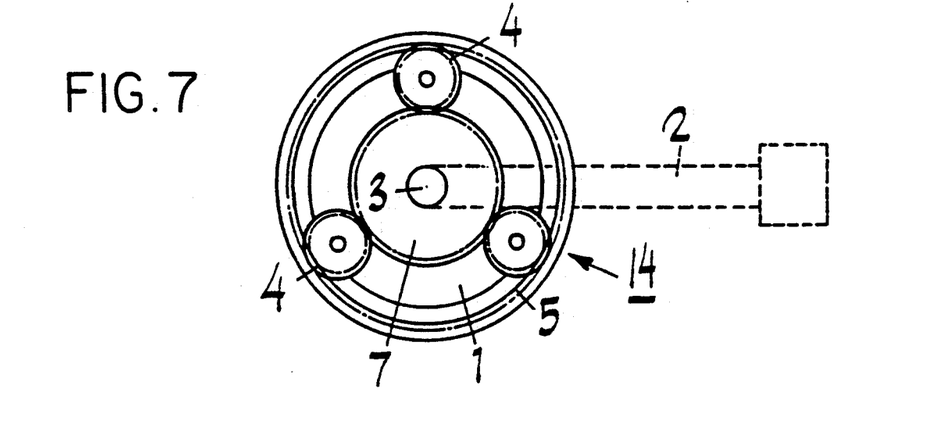
FIG. 7 is a schematic view of the pedal arrangement for the planetary gear assembly of FIG. 2.
Figure 8:
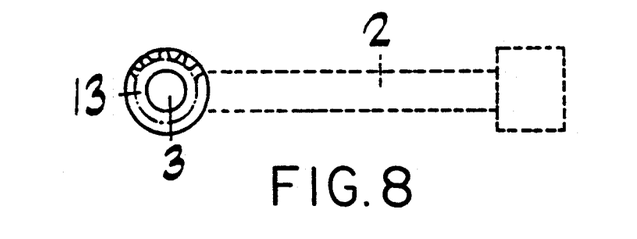
FIG. 8 is a schematic view of the pedal arrangement for the planetary gear assembly of FIG. 6.

In FIGS. 5, 6 and 8, another embodiment of this invention has the planetary gear assembly 14 provided at the rear wheel of the bicycle. Like parts in these figures to those shown in FIGS. 1 to 4 and 7 are denoted by like reference numerals. The disc shaped carrier 1 is fixed integrally to the rear wheel axle shaft 9 and carries the planetary gear pinions 4, the ring gear 5 is formed integrally on the internal surface of the flange wall 6B of the housing 6, and the sun gear 7 is fixed to a hub 10 for the rear wheel 20 (indicated as spokes in dashed lines in FIG. 6). Preferably, the hub 10 is formed integrally with the sun gear 7 and provides a spoke rim for the rear wheel 20 of the bicycle. The hub 10 is spaced apart opposite from the side wall 6A of the housing with the pinion gear carrier 1 disposed between them. The rear sprocket wheel 11 is fixed at one side of the rear wheel axle shaft 9, and a ratchet wheel 12 is provided to allow free revolution. A driving sprocket wheel 13 of small diameter is formed integrally with the driving axle shaft 3 driven by the driving arms 2 at the pedal position, and is linked to the rear sprocket wheel 11 by a chain 21.

The operation and effect of the present invention thus constructed will now be explained in detail. When the driving arms 2 and driving axle shaft 3 are turned by turning the pedals, the carrier 1 of the planetary gear assembly formed integrally with the driving axle shaft 3 turns with the planetary pinion gears turning in mesh with the ring gear 5 of the housing 6 fixed to the bicycle frame F and the sun gear 7 rotating at the center of the assembly. Accordingly, while the carrier 1 turns in the direction of the driving arms 2, each of the planetary pinion gears 4 rotate in an opposite direction in mesh with the fixed ring gear 5 so as to transmit the pedal force by rotation of the sun gear 7 in the same direction as the driving arms 2. When the planetary gear assembly is at the pedal position, the sun gear output is coupled to the rear wheel through the integral driving sprocket wheels 8, 8A to the rear sprocket wheel 11 fixed to the rear axle shaft which is fixed to a suitable rear wheel hub. When the assembly is at the rear wheel position, the sun gear coupling is through the integral rear wheel hub 10.

The planetary gear assembly provides a power increasing ratio of the power applied to the driving arms to the power transmitted to the rear wheel which is determined by the sun gear having a number of teeth S in relation to the ring gear having a number of teeth R. The power changing ratio is thus equal to $(S+R)/S$. For example, if the number of teeth of the sun gear=21, and the number of teeth of the ring gear =53, then the power changing ratio is $(21+53)/(21)$, or about 3.5.

This means that for each rotation of the driving axle shaft 3, the sun gear 7 rotates about 3.5 times. If the number of sprocket teeth of the selected set of the driving sprocket wheel is selected to be 35, then each rotation of the driving axle shaft 3 produces a turning equivalent of $3.5 \times 35 = 123$ of sprocket wheel teeth. Actually, the conventional sprocket wheel 101 of 13 cm diameter has 52 teeth, and a sprocket wheel of 11 cm diameter has 48 teeth. Therefore, the planetary gear assembly using a smaller sprocket wheel with 35 teeth at the pedal position has an effect of more than double relative to the conventional mechanism.

Moreover, the present invention provides excellent advantages in terms of the energy required for turning the pedals. In the conventional mechanism, since the driving sprocket wheel 101 is fixed integrally with the pedals and the diameter (11-13 cm) is large and the weight is heavy, in comparison to that of the invention, the conventional mechanism requires a much greater turning energy for the bicyclist. This can sap the physical strength of the bicyclist when bicycling over a long time or running at high speed or rising up a steeply sloped road. However, in the present invention, since the sprocket wheel 8 can have a reduced diameter and lighter weight, the ratio of radii of the sprocket wheel to the driving arms is higher, for example about $\frac{1}{4}$, thereby resulting in greater leverage per effort in turning the pedals), and high speed running for long time even with less power is possible. Even when using a smaller number of teeth is used for the driving sprocket wheels 8, 8A, a bicyclist can easily pedal up a steeply sloped road.

In the case where the planetary gear assembly 14 of the present invention is arranged at the rear wheel axle shaft 9, a driving sprocket wheel 13 of small diameter is used at the driving axle shaft 9, and its rotating power is transmitted via the rear sprocket wheel 11 to the rear wheel axle shaft 9 through the chain 21, and the planetary gear assembly 14 operating by the same principle transmits the rotating power to the hub 10 with the selected power changing ratio as described above. As shown in FIG. 8, since the radius of the driving sprocket wheel 13 mounted integrally with the driving axle shaft 3 is reduced (as compared to that of FIG. 7), its weight becomes lighter and also the ratio to the length of the driving arm 2 becomes larger. Therefore, there is the advantage that the above mentioned effect can be obtained by even less power. A multiple set of rear sprocket wheels and conventional gear changing mechanism may also be used to provide a range of power changing ratios for the rear-wheel embodiment.

Figure 1:
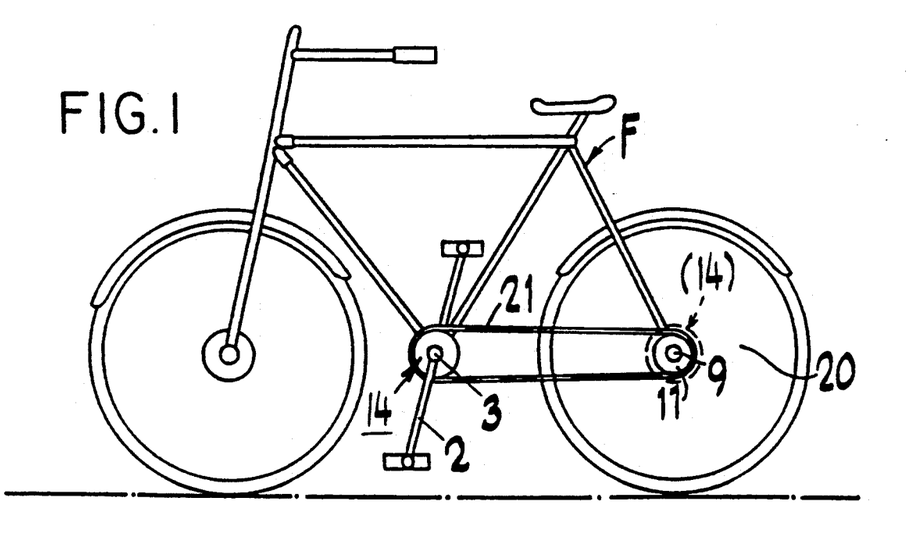
FIG. 1 is a side view showing a planetary gear assembly at the pedal position alone, or at both the pedal position and the rear wheel, in accordance with the present invention.
Figure 2:
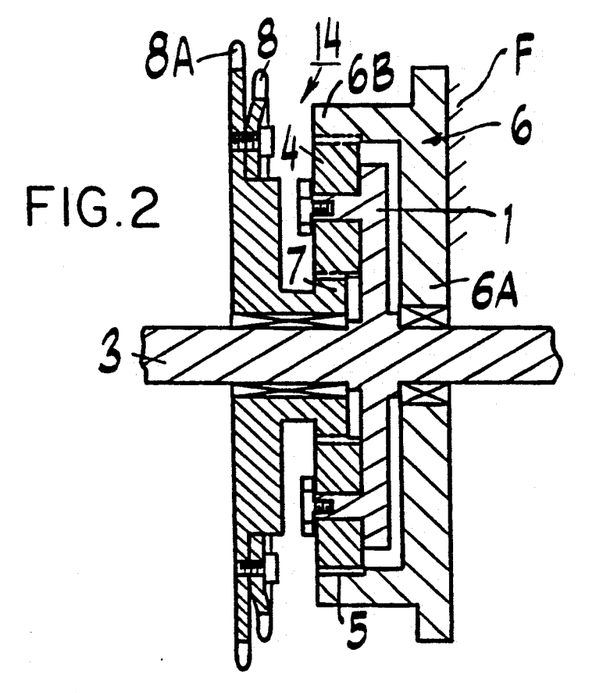
FIG. 2 is a longitudinal cross sectional view of the planetary gear assembly for the pedal position in FIG. 1.

Further, when the planetary gear assembly 14 of the present invention is arranged at both the driving axle shaft 3 and the rear wheel axle shaft 9, as indicated in FIG. 1 by one unit 14 at the pedal position and another unit 14 (in dashed lines) at the rear wheel position, the above effect is doubled (power changing ratio of about 7.0) even though the increase in cost is relatively low. Therefore, a further increase in power ratio can be obtained with even less power applied by the bicyclist.

Figure 10:
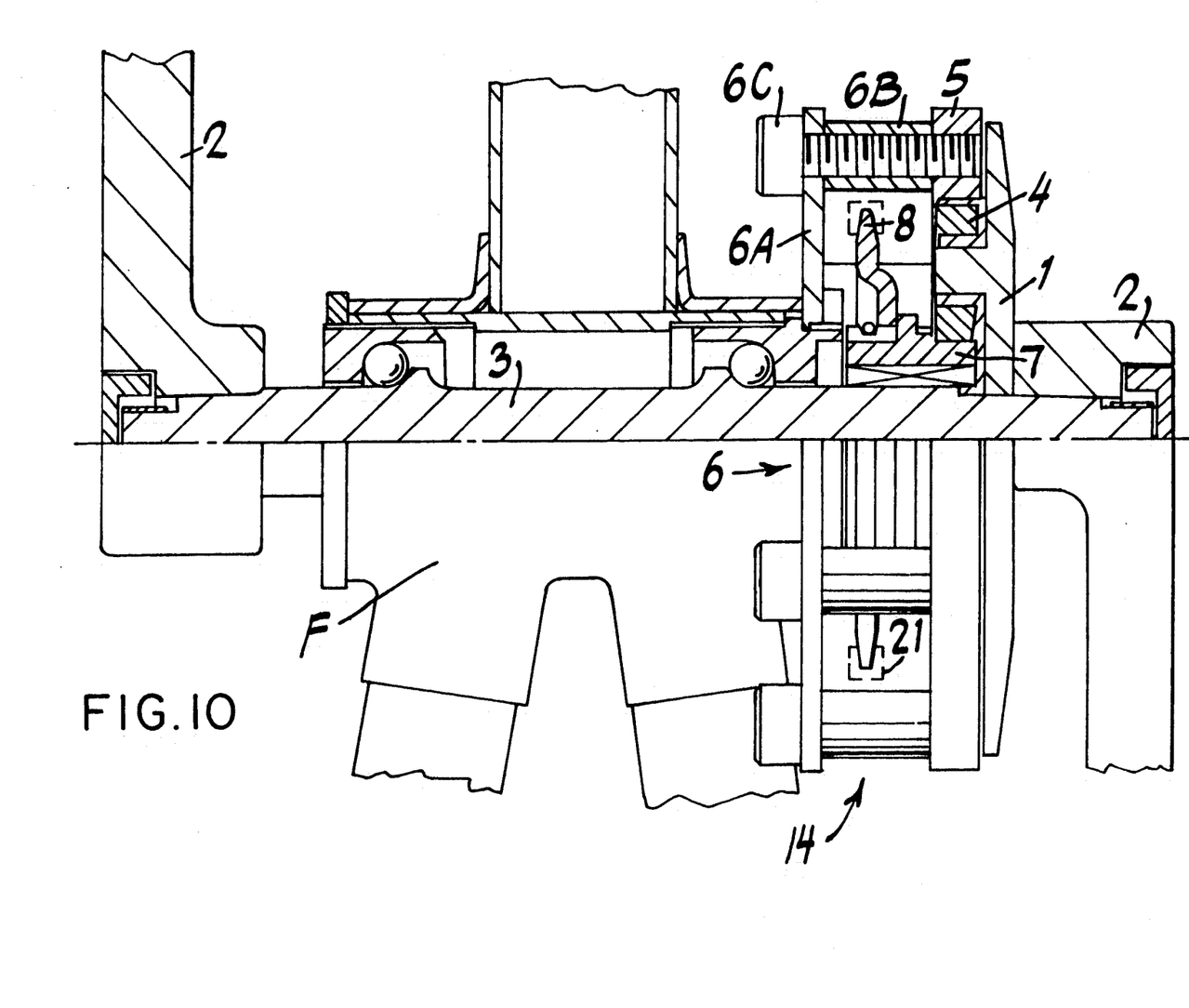
FIG. 10 a plan sectional view of an alternate configuration for the planetary gear assembly.

An alternate construction of the power driving device in accordance with the invention is shown in FIG. 10. For implementation at the pedal position, the planetary gear assembly 14 is secured to one side of the bicycle frame F on the driving axle shaft 3 between the pedal arms 2. The housing 6 is comprised of a side plate 6A and a spacer/connecting flange or ring 6B fastened by bolts 6C to a guide gear 5 having the ring gear teeth at its inner diameter. The carrier plate 1 for the pinion gears 4 is arranged spaced apart opposite from the side plate 6A with the sprocket wheel 8 positioned in between them. The sprocket wheel 8 is thus contained within the confines of the housing 6 and carrier plate of the planetary gear assembly. The bolts 6C are positioned circumferentially to allow space for passage of the chain 21 linking the front sprocket wheel to the rear sprocket wheel.

In the above alternate embodiment, the guide gear may have dimensions, for example, of 10 cm diameter and 7 mm thickness with 72 gear ring teeth at an internal diameter of 7.2 cm, the spacer/connecting flange of about 15 mm thickness, and the side plate of 10 cm diameter and 3 mm thickness. Thus, the housing 6 has a diameter of 10 cm and total thickness of about 25 mm. The pinion gears 4 each have a diameter of 2.1 cm and 21 teeth. The sun (axle) gear 7 has a diameter of 3.2 cm and 30 teeth. The front sprocket wheel may be configured to have 15 teeth and the rear sprocket wheel 18 teeth. This configuration results in a rotation ratio of about 2.6 rotations of the pedals per rotation of the rear wheel, which is similar to conventional bicycles. However, because of the power changing ratio of the planetary gear assembly, the efficiency of pedalling in the invention is found to be increased by about 35%.

The above alternate embodiment may instead be mounted at the rear wheel. The rear wheel hub (10) is directly connected to the sun (axle) gear 7, and the other parts are mounted as described previously.

With the assemblies disposed at both the front and rear positions, a combined power changing ratio of double the individual ratio is obtained. If the individual ratio is 3.4, and the front sprocket wheel has 9 teeth and the rear sprocket wheel has 19 teeth, the total rotation ratio is $3.4 \times 9/19 \times 3.4 = 5.5$. The high rotation ratio of 5.5 allows the bicyclist to obtain a fast speed on level ground which can be maintained with a minimum of force.

Performance test performed on the inventive bicycle as compared with a conventional bicycle show the superiority of its features. A front-mounted power driving unit was tested having a rotation ratio of 2.6, which was the same as for the conventional bicycle. The results of a tread mill test over a test running distance of 5,000 meters showed that the inventive bicycle is 10% to 35% more efficient than the conventional bicycle. The efficiency was manifested both in increased speed, as well as the lower oxygen consumption and heart rate of the bicyclist. The oxygen uptake for a given heart rate was about 5% less for the inventive bicycle. The oxygen uptake per unit distance was about 40% less for any given rpm/dist./min. For given levels of oxygen consumption, the speeds (meters/min.) obtained by the inventive bicycle were about 30% to 60% greater.

In summary, the present invention is constructed such that the driving axle shaft 3, powered through the driving arms 2, either directly drives the disc-shaped carrier 1 at the pedal position, and/or drives the carrier at the rear wheel axle shaft 9 through a small sprocket wheel 13 at the pedal position and a small rear sprocket wheel 11 at the rear wheel axle shaft 9. The planetary pinion gears 4 carried on the carrier 1 drive the sun gear 7 meshed with them. Then, either the driving power is transmitted to the rear wheel by the sprocket wheel 8, 8A or by the rear hub 10 fixed integrally with the sun gear 7. The result is obtained that running at high speed or rising up a steeply sloped road can be executed with less driving power relative to the conventional bicycle. Because its structure is compact and relatively simple, the manufacturing cost is kept low and assembly is made very easy.

Numerous modifications and variations are of course possible given the above disclosure of the principles and mode of carrying out the invention. It is intended that all such modifications and variations be considered as within the spirit and scope of the invention, as defined in the following claims.

I claim:

1. A power driving device for a bicycle including a frame, pedals mounted by driving arms on a driving axle shaft at a pedal position of the bicycle frame, and a rear wheel mounted on a rear wheel axle shaft and having a rear sprocket wheel for transmitting driving force to the rear wheel, comprising:

a planetary gear assembly mounted with the driving axle shaft, said assembly including a housing fixed to the bicycle frame at the pedal position and having a side wall for mounting said driving axle shaft for rotation and a flange wall projecting laterally from said side wall at a position radially remote from said driving axle shaft for containing said planetary gear assembly therein, a disc shaped carrier fixed to said driving axle shaft for rotation together therewith upon application of a driving force to the pedals, a plurality of rotatable planetary pinion gears carried on said carrier, a ring gear fixed to said flange wall of said housing with teeth facing radially inward toward and engaged with those of said planetary pinion gears, and a sun gear rotatably mounted on said driving axle shaft with teeth facing radially outward toward and engaged with those of said planetary pinion gears; and a driving sprocket wheel rotatably mounted on said driving axle shaft and fixedly connected to said sun gear for rotation together with said sun gear for transmitting an output rotational power of said sun gear through a linking means to said rear sprocket wheel to drive the rear wheel of the bicycle, wherein said carrier is a plate spaced apart by a given distance opposite from said side wall, and said driving sprocket wheel is arranged in the space between said carrier and said side wall.

2. A power driving device according to claim 1, wherein said sun gear has a number of teeth S in relation to said ring gear having a number of teeth R such that a power changing ration $(S+R)/S$ for the planetary gear assembly is selected to be equal to about 3.5, so that the driving sprocket wheel can have a number of teeth which is substantially less than that of a sprocket wheel as used in a conventional bicycle transmission not having said power driving device, yet, when multiplied by said power changing ratio of said planetary gear assembly, is equivalent to more than double the number of teeth of the sprocket wheel as used in the conventional bicycle.

3. A power driving device according to claim 1, wherein said carrier is formed integrally with said driving axle shaft, and said driving sprocket wheel is formed integrally with said sun gear.

4. A power driving device according to claim 1, wherein said ring gear is formed integrally with said housing flange wall.

5. A power driving device according to claim 1, wherein said carrier is a plate arranged adjacent said side wall of said housing, and said driving sprocket wheel is spaced apart from said side wall by a given distance with said carrier plate in between them.

6. A power driving device according to claim 1, wherein said ring gear is formed as a guide gear unit which is secured by bolts to a spacer/connecting flange and a side plate comprising said housing.

7. A power driving device for a bicycle including a frame, pedals mounted by driving arms on a driving axle shaft at a pedal position of the bicycle frame, and a rear wheel mounted on a rear wheel axle shaft, comprising:

a planetary gear assembly mounted with said rear wheel axle shaft, said assembly including a housing fixed to the bicycle frame and having a side wall for mounting said rear axle shaft for rotation and a flange wall projecting laterally from said side wall at a position radially remote from said rear axle shaft for containing said planetary gear assembly, a disc shaped carrier fixed to said rear wheel axle shaft for rotation together therewith upon application of a driving force to the pedals, a plurality of rotatable planetary pinion gears carried on said carrier, a ring gear fixed to said flange wall of said housing with teeth facing radially inward toward and engaged with those of said planetary pinion gears, and a sun gear rotatably mounted on said rear wheel axle shaft with teeth facing radially outward toward and engaged with those of said planetary pinion gears; and driving means formed by a driving sprocket wheel fixed to the driving axle shaft, a rear sprocket wheel fixed to said rear axle shaft, linking means connecting said driving sprocket wheel to said rear sprocket wheel, and a hub rotatably mounted on said rear wheel axle shaft and fixed to said rear wheel and to said sun gear for rotation together with said rear wheel and sun gear, driven through said planetary pinion gears, said rear wheel axle shaft, said rear sprocket wheel, and said driving sprocket wheel, to the rear wheel of the bicycle.

8. A power driving device according to claim 7, wherein said carrier is formed integrally with said rear wheel axle shaft, and said hub is formed integrally with said sun gear.

9. A power driving device according to claim 7, wherein said ring gear is formed integrally with said housing flange wall.

10. A power driving device according to claim 7, wherein said ring gear is formed as a guide gear unit which is secured by bolts to a spacer/connecting flange and a side plate comprising said housing.

11. A power driving device according to claim 7, wherein said carrier is a plate arranged adjacent said side wall of said housing, and said hub is spaced apart from said side wall by a given distance with said carrier plate in between them.

12. A power driving device according to claim 7, wherein said sun gear has number of teeth S in relation to said ring gear having a number of teeth R such that a power changing ratio $(S+R)/S$ for the planetary gear assembly is equal to about 3.5, so that the rear sprocket wheel can have a diameter and number of teeth substantially less than that of a sprocket wheel as used in a conventional bicycle transmission not having said power driving device, yet, when multiplied by said power changing ratio of said planetary gear assembly, is equivalent to or greater than that of the sprocket wheel as used in the conventional bicycle.

13. A power driving device for a bicycle including a frame, pedals mounted by driving arms on a driving axle shaft at a pedal position of the bicycle frame, and a rear wheel mounted on a rear wheel axle shaft, comprising:

a first planetary gear assembly mounted with the driving axle shaft, said first planetary gear assembly including a housing carrying a ring gear fixed to the bicycle frame and mounting said driving axle shaft for rotation, a carrier fixed to said driving axle shaft for rotation, a carrier fixed to said driving axle shaft for rotation together therewith upon application of a driving force to the pedals, a plurality of rotatable planetary pinion gears carried on said carrier engaged with said ring gear, and a sun gear rotatably mounted on said driving axle shaft and engaged with said planetary pinion gears; and a driving sprocket wheel fixedly connected to said sun gear of said first planetary gear assembly for rotation together with said sun gear for transmitting an output rotational force of said sun gear to said rear wheel;

a second planetary gear assembly mounted with said rear wheel axle shaft, wherein said second planetary gear assembly includes a housing carrying a second ring gear fixed to the bicycle frame and mounting said rear wheel axle shaft for rotation, a second carrier fixed to said rear wheel axle shaft for rotation together therewith, a plurality of planetary pinion gears carried on said carrier engaged with said ring gear, and a sun gear rotatably mounted on said rear wheel axle shaft and engaged with said planetary pinion gears of said second planetary gear assembly;

a rear sprocket wheel fixedly connected to said rear wheel axle shaft for rotation therewith for transmitting an output rotational force from said driving sprocket wheel to said planetary pinion gears of said second planetary gear assembly;

a hub rotatably mounted on said rear wheel axle shaft and fixed to said rear wheel and to said second sun gear of said second planetary gear assembly for rotation together with said rear wheel and sun gear; and linking means connecting said driving sprocket wheel driven by said first planetary gear assembly to said rear sprocket wheel driving said second planetary gear assembly, in order to transmit an output rotational force with a combined power changing ratio of said first and second planetary gear assemblies to said rear wheel of the bicycle.

14. A power driving device according to claim 13, wherein each of said planetary gear assemblies respectively includes the sun gear having a number of teeth S in relation to the ring gear having a number of teeth R such that the power changing ratio $(S+R)/S$ for each planetary gear assembly is equal to about 3.5, and a combined power changing ratio of about double is obtained.

15. A power driving device according to claim 13, wherein said driving sprocket wheel has a ratio of teeth in relation to said rear sprocket wheel of about 9/19, and a total rotation ratio of rotation of the pedals to the rear wheel of about 5.5 is obtained.

16. A power driving device according to claim 13, wherein each of said planetary gear assemblies respectively includes said carrier formed integrally with the respective axle shaft.

17. A power driving device according to claim 13, wherein said ring gear of each assembly is formed integrally with said housing flange wall.

18. A power driving device according to claim 13, wherein said ring gear of each assembly is formed as a guide gear unit which is secured by bolts to a spacer/connecting flange and a side plate comprising said housing.

19. A power driving device according to claim 13, wherein said carrier of each assembly is a plate spaced apart by a given distance opposite from said side wall, and the respective sprocket wheel is arranged in the space between said carrier plate and said side wall.

* * * * *